United States Patent [19]
Oyama

[11] Patent Number: 5,862,296
[45] Date of Patent: Jan. 19, 1999

[54] INFORMATION SIGNAL REPRODUCING APPARATUS

[75] Inventor: Kouichi Oyama, Kanagawa, Japan

[73] Assignee: Sony Corporation, Tokyo, Japan

[21] Appl. No.: 716,880

[22] Filed: Sep. 20, 1996

Related U.S. Application Data

[63] Continuation of Ser. No. 271,920, Jul. 8, 1994, abandoned.

[30] Foreign Application Priority Data

Jul. 19, 1993 [JP] Japan .................................... 5-200054

[51] Int. Cl.$^6$ ..................................................... H04N 5/91
[52] U.S. Cl. .......................... 386/69; 360/72.1; 360/74.4
[58] Field of Search .......................... 360/27, 72.1, 72.2, 360/74.1, 74.4; 386/69, 68, 81

[56] References Cited

U.S. PATENT DOCUMENTS

| | | | |
|---|---|---|---|
| 4,794,474 | 12/1988 | Dwyer et al. | 360/72.2 |
| 4,816,936 | 3/1989 | Sakuragi | 360/72.02 |
| 4,958,242 | 9/1990 | Aoki | 360/27 |
| 5,115,324 | 5/1992 | Takimoto et al. | 360/14.1 |
| 5,157,509 | 10/1992 | Takimoto et al. | 360/72.2 |
| 5,253,121 | 10/1993 | Asano | 360/72.1 |

FOREIGN PATENT DOCUMENTS

| | | |
|---|---|---|
| 0 160 102 | 11/1985 | European Pat. Off. . |
| 0 507 252 | 10/1992 | European Pat. Off. . |
| 37 05 353 | 8/1987 | Germany . |
| 2 170 347 | 7/1986 | United Kingdom . |

OTHER PUBLICATIONS

Patent Abstracts of Japan, vol. 11, No. 358 (P–639), 21 Nov. 1987, & JP–A–62 134840 (Alpine Electron, Inc., 7 Jun. 1987.
Patent Abstracts of Japan, vol. 15, No. 156 (P–1192), 18 Apr. 1991 & JP–A–03 025743 (Matsushita Electric Ind. Co., Ltd.), 4 Feb. 1991.
Patent Abstracts of Japan, vol. 18, No. 445 (P–1789), 18 Aug. 1994 & JP–A–06 139652 (Sony Corporation), 20 May 1994.

*Primary Examiner*—Andrew L. Sniezek
*Attorney, Agent, or Firm*—Frommer Lawrence & Haug, LLP.; William S. Frommer; Dennis M. Smid

[57] ABSTRACT

An information signal reproducing apparatus which enables the top of a recorded image to be located within a short time without a special setting operation. When a date search key and a fast-forward (FF) key are successively pressed, a search for a date change point is made in the fast-forward mode, and subsequently, cuing up for the date change point is executed in the review (REV) mode. When the date search key and a rewind (REW) key are successively pressed, a search for a date change point is made in the rewind mode. Subsequently, cuing up for the date change point is executed in the cue (CUE) mode, and further the date change point cuing-up operation is executed in the review mode.

20 Claims, 11 Drawing Sheets

| Conditions | | Data |
|---|---|---|
| Even-numbered second | Even-numbered frame | Time code (T) |
| | | Time code (T) |
| | Odd-numbered frame | Year/month/day (P) |
| | | Hour/minute/second (N) |
| Odd-numbered second | Even-numbered frame | Hour/minute/second (N) |
| | | Year/month/day (P) |
| | Odd-numbered frame | Time code (T) |
| | | Time code (T) |

| Initial state | Control key | Search operation | Cuing-up operation |
|---|---|---|---|
| Stop | Fast-forward | Fast-forward | Review |
| | Rewind | Rewind | Cue → Review |
| Playback | Fast-forward | Cue | Review |
| | Rewind | Review | Not performed |

INFORMATION SIGNAL REPRODUCING APPARATUS

This application is a continuation of application Ser. No. 08/271,920, filed Jul. 8, 1994 now abandoned.

BACKGROUND OF THE INVENTION

1. Field of the Invention

The present invention relates to an apparatus having an information signal reproducing function (hereinafter referred to as "information signal reproducing apparatus", e.g., a video tape recorder (hereinafter referred to as "VTR") which is united with a camera, i.e., what is called video camera. More particularly, the present invention relates to an information signal reproducing apparatus which is characterized by the method of locating the top of recorded information (the process of locating the top of recorded information will hereinafter be referred to as "cuing up").

2. Description of the Background Art

As a method of locating the top of a recorded image in a video camera or a stationary VTR, there is a method in which an index signal is recorded on a longitudinal or diagonal track of a video tape in association with the top of a recorded image by setting an index signal recording mode at the time of video recording, and cuing up is executed by using the recorded index signal.

However, this method needs an operation of setting the index signal recording mode. Therefore, when the video recording mode and the stand-by mode are frequently repeated as in the case of a video camera, every time the video recording mode is set by actuating the video recording button, it is necessary to judge whether or not recording of an index signal is required, and if required, the index signal recording mode must be set. Therefore, the operation is troublesome. If the system is arranged so that the index signal recording mode will be automatically set every time the video recording mode is set, the number of positions where index signals are recorded undesirably increases, resulting in an increase in the time required for the cuing-up operation.

OBJECT AND SUMMARY OF THE INVENTION

In view of the above-described problems of the background art, it is an object of the present invention to provide an information signal reproducing apparatus which enables the top of a recorded image to be located within a short time without a special setting operation.

According to a first aspect of the present invention, there is provided an information signal reproducing apparatus for reproducing a video signal and date data from a magnetic tape having the video signal recorded on a predetermined portion of a diagonal track and further having the date data recorded on a portion of the diagonal track which is different from the video signal recording portion. The information signal reproducing apparatus includes a first device for setting a search mode for effecting cuing up at a point where the date data changes, and a second device for detecting date data reproduced from the magnetic tape. The information signal reproducing apparatus further includes a third device for controlling the operation mode of the information signal reproducing apparatus on the basis of the outputs from the first and second devices. The third device effects control such that a search operation is executed in the search mode set by the first device, and a cuing-up operation is executed in a review mode.

According to a second aspect of the present invention, the system is arranged to detect as a date data change a change from a state where date data is present to a state where no date data is present, or a change from a state where no date data is present to a state where date data is present.

According to a third aspect of the present invention, the system is arranged such that when a search mark is detected in a portion where no date data is present, it is not detected as a date data change.

According to a fourth aspect of the present invention, the system is arranged to provide a scan mode in which a cuing-up operation and a playback operation are alternately repeated and to effect detection such that a date change in a portion which has been run during the playback operation is not detected during the scan mode executed in the backward direction.

According to a fifth aspect of the present invention, the system is arranged such that when the cuing-up operation has continued for a predetermined time, the operation mode returns to the search operation.

Thus, according to the first aspect of the present invention, cuing up for a date change point is executed in the review mode. Therefore, upon completion of the cuing-up operation, it is possible to start playback just before the date change point without fail.

According to the second aspect of the present invention, it is possible to detect the top of an undated portion, e.g., an unrecorded portion, of a magnetic tape.

According to the third aspect of the present invention, when a search mark is given with date data erased, the search mark is not detected as a date change point.

According to the fourth aspect of the present invention, during the scan mode executed in the backward direction, a date change in the portion of the magnetic tape which has been run for playback is not detected.

According to the fifth aspect of the present invention, when a cuing-up operation has continued for a predetermined time, the operation mode returns to a search operation.

DETAILED DESCRIPTION OF THE PREFERRED EMBODIMENTS

One Embodiment of the present invention will be described below in detail with reference to the accompanying drawings in the following sequence:

1. Arrangement of a VTR to which the present invention is applied;
2. Date search operation; and
3. Operation flowchart of the embodiment.

Figure 1:
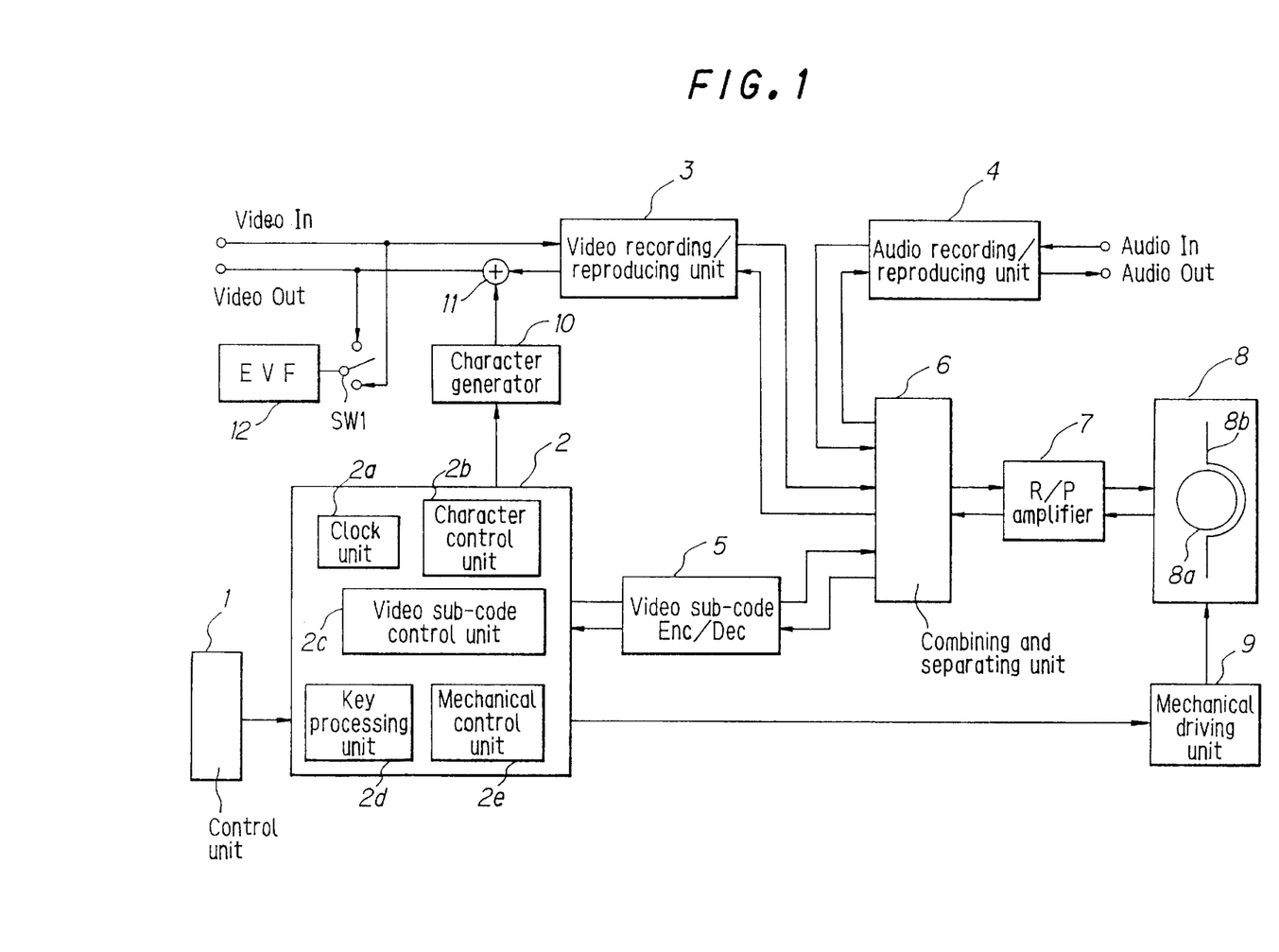
FIG. 1 is a block diagram showing the arrangement of a VTR to which the present invention is applied.
Figure 2:
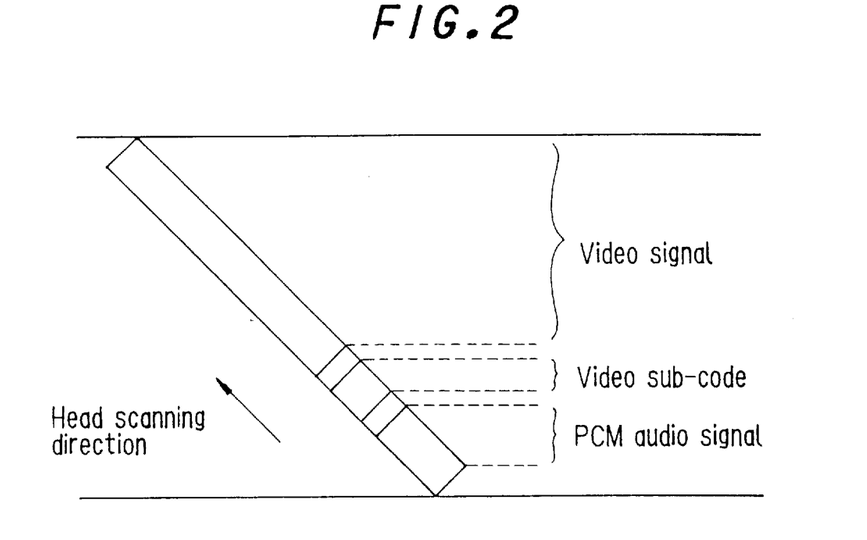
FIG. 2 shows a track format used in the VTR to which the present invention is applied.

1. Arrangement and operation of a VTR to which the present invention is applied:

FIG. 1 is a block diagram showing the arrangement of a VTR to which the present invention is applied. FIG. 2 shows the track format used in the VTR.

Referring to FIG. 1, a control unit 1 is a part which is actuated by the user to input various operation modes of the VTR and other necessary instructions. A main microcomputer 2 has a function of detecting a state of each part of the whole VTR and controlling the operation of each part.

A video recording/reproducing unit 3 performs recording processing, e.g., frequency modulation of the brightness signal, for a video signal which is supplied from a camera part (not shown) or a tuner part (not shown), and supplies the processed video signal to a combining and separating unit 6. The video recording/reproducing unit 3 also executes reproducing processing, e.g., demodulation of the brightness signal, for a reproduced video signal supplied from the combining and separating unit 6.

An audio recording/reproducing unit 4 performs recording processing, e.g., A/D conversion, for an audio signal which is supplied from a microphone (not shown) or other similar device, and supplies the processed audio signal to the combining and separating unit 6. The audio recording/reproducing unit 4 also executes reproducing processing, e.g., D/A conversion, for a reproduced PCM audio signal which is supplied from the combining and separating unit 6.

A video sub-code encoder/decoder 5 generates a predetermined video sub-code under the control of a video sub-code control unit 2c in the main microcomputer 2, and supplies the video sub-code to the combining and separating unit 6. Further, the video sub-code encoder/decoder 5 decodes a reproduced video sub-code which is supplied from the combining and separating unit 6, and supplies the decoded sub-code to the video sub-code control unit 2c.

The combining and separating unit 6 combines at a predetermined timing the video signal, the PCM audio signal, and the video sub-code, which are supplied from the video recording/reproducing unit 3, the audio recording/reproducing unit 4, and the video sub-code encoder/decoder 5, and supplies the resulting signal to a recording/playback amplifier 7. Further, the combining and separating unit 6 separates a video signal, a PCM audio signal and a video sub-code from a reproduced signal which is supplied from the recording/playback amplifier 7, and supplies them to the video recording/reproducing unit 3, the audio recording/reproducing unit 4, and the video sub-code encoder/decoder 5, respectively.

The recording/playback amplifier 7 amplifies the signal supplied from the combining and separating unit 6, and supplies the amplified signal to a mechanical system 8. The recording/playback amplifier 7 also amplifies a reproduced signal which is supplied from the mechanical system 8, and supplies the amplified signal to the combining and separating unit 6.

The mechanical system 8 has a drum unit 8a, which is equipped with a plurality of magnetic heads (not shown), and a magnetic tape 8b. The mechanical system 8 effects recording/playback of a video signal with the magnetic heads by dividing video signal information constituting 1 frame into two tracks. As shown in FIG. 2, each track on the magnetic tape 8b is provided with areas for recording a PCM audio signal, a video sub-code, and a video signal in the mentioned order in the magnetic head scanning direction.

A mechanical driving unit 9 drives the magnetic tape 8a to run in a predetermined mode under the control of a mechanical control unit 2e in the main microcomputer 2 according to an operation mode inputted from the control unit 1.

A character generator 10 converts the reproduced video sub-code and the operation mode of the VTR into character patterns under the control of a character control unit 2b in the main microcomputer 2, and supplies the character patterns to an adder 11. The adder 11 superimposes the character patterns on the reproduced video signal which is output from the video recording/reproducing unit 3, and outputs the resulting signal. An electronic viewfinder 12 selects by a switching circuit SW1 either the video signal inputted from the camera part or the tuner part or the reproduced video signal outputted from the adder 11, and inputs the selected video signal to the system.

Figure 3:
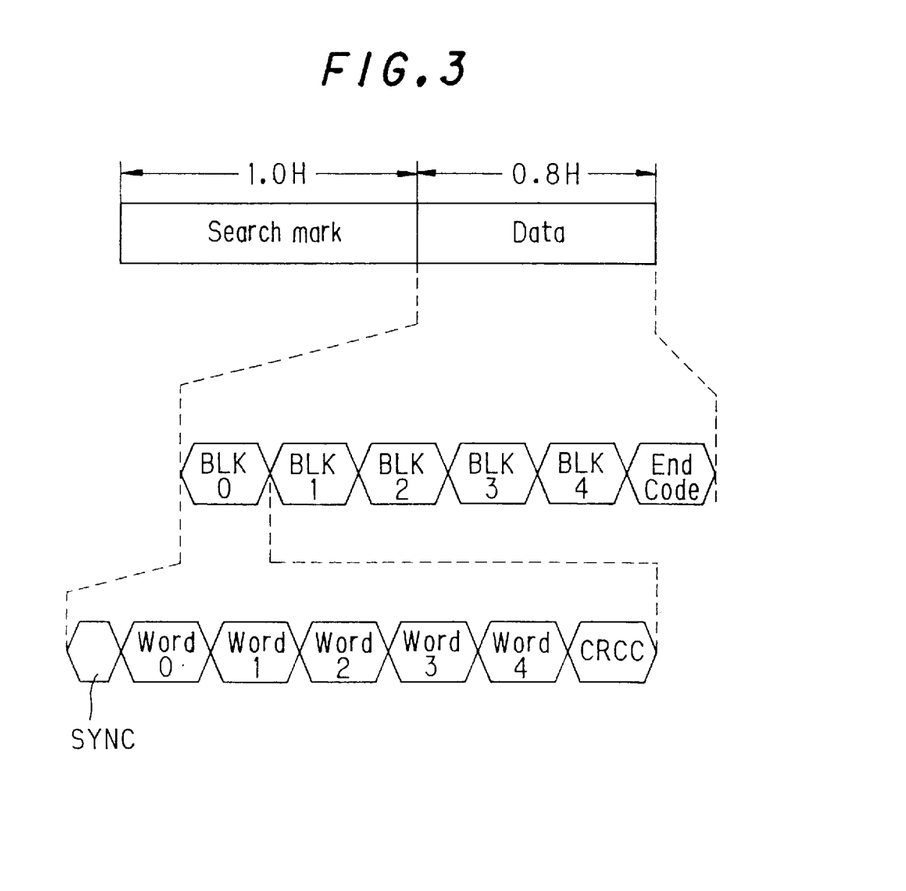
FIG. 3 shows the format of a video sub-code.

As shown in FIG. 3, the video sub-code is composed of a search mark of 1.0 H (H represents the horizontal scanning period) and data of 0.8 H. The search mark corresponds to the index signal which has already been described in connection with the background art. When the search mark is used for index search, all the bits of the search mark are set to "0" or "1" for, for example, 10 seconds, i.e., 600 tracks. The data is composed of 5 blocks BLK0 to BLK4 and an end code indicating the end of the data. Each block is composed of a synchronizing signal SYNC, 5 words Word0 to Word4, and a CRCC code for error correction.

Figure 4:
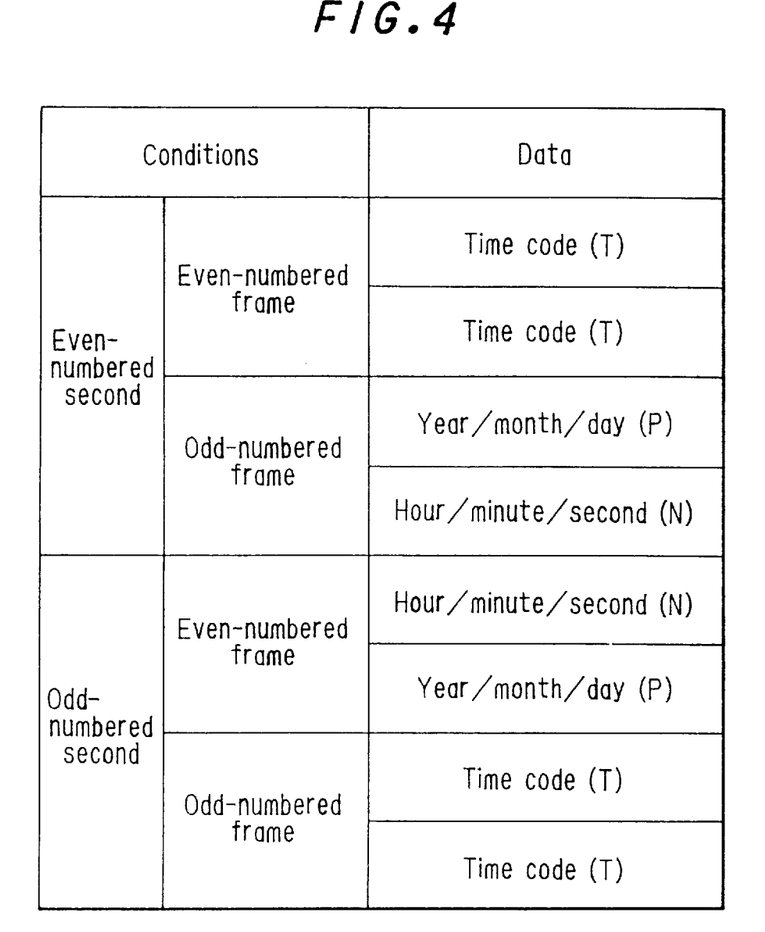
FIG. 4 shows video sub-code recording conditions.

Usually, data is recorded according to a set of rules such as that shown in FIG. 4. That is, at an even-numbered second, in an even-numbered frame, time code (T) is recorded in the first field, and time code (T) is also recorded in the second field, whereas in an odd-numbered frame, year/month/day (P) is recorded in the first field, and hour/minute/second (N) is recorded in the second field. At an odd-numbered second, in an even-numbered frame, hour/minute/second (N) is recorded in the first field, and year/month/day (P) is recorded in the second field, whereas in an odd-numbered frame, time code (T) is recorded in the first field, and time code (T) is also recorded in the second field.

Figure 5:
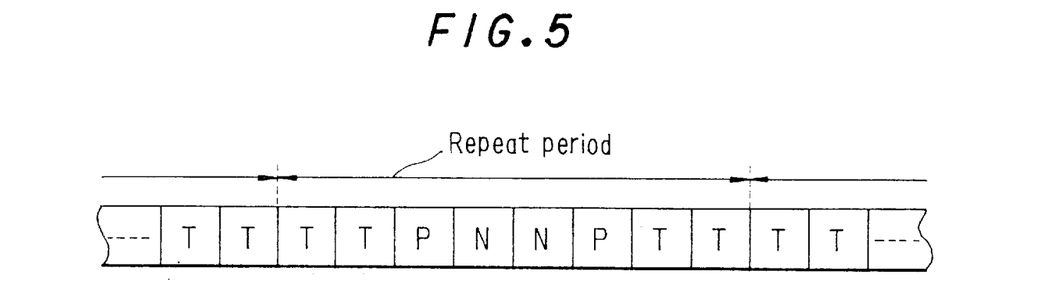
FIG. 5 shows video sub-codes in a time-series manner in units of tracks.

FIG. 5 illustrates the above recorded data in a time-series manner in units of tracks. It will be understood that the same pattern is repeated every 8 tracks, that is, every 8 fields.

In this embodiment, when all the bits of the search mark are set to "0" or "1" for executing index search after the video sub-code has been recorded as shown in FIGS. 4 and 5, the data on year/month/day (P) and the data on hour/minute/second (N) are erased from the video sub-code.

Figure 6:
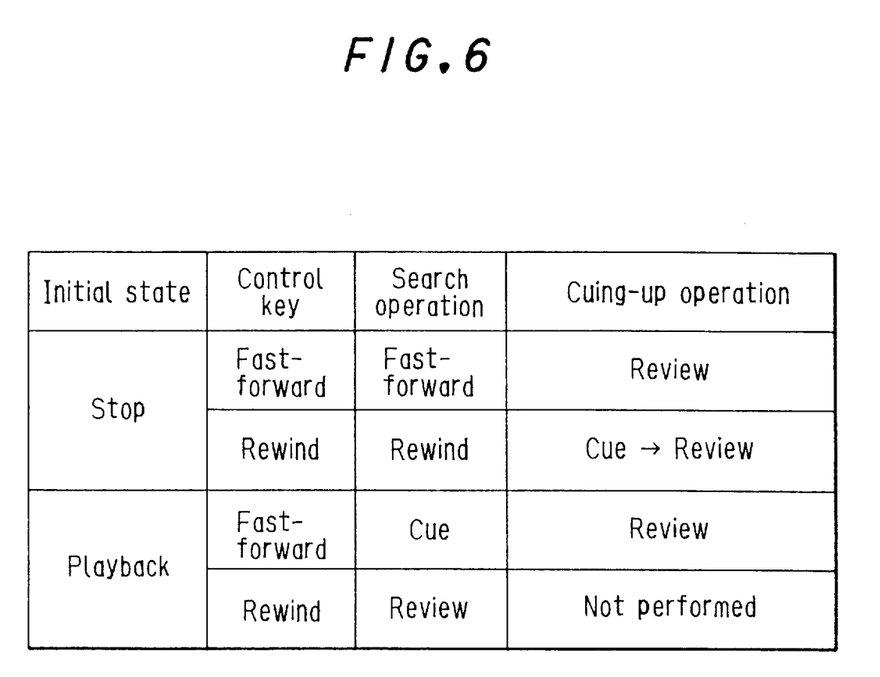
FIG. 6 shows the state transition of a date search operation mode in one embodiment of the present invention.

2. Date search operation:

FIG. 6 shows the state transition of the date search operation mode in this embodiment. FIGS. 7A to 9B show the association between the date on the magnetic tape and the operation mode.

Figure 7A:
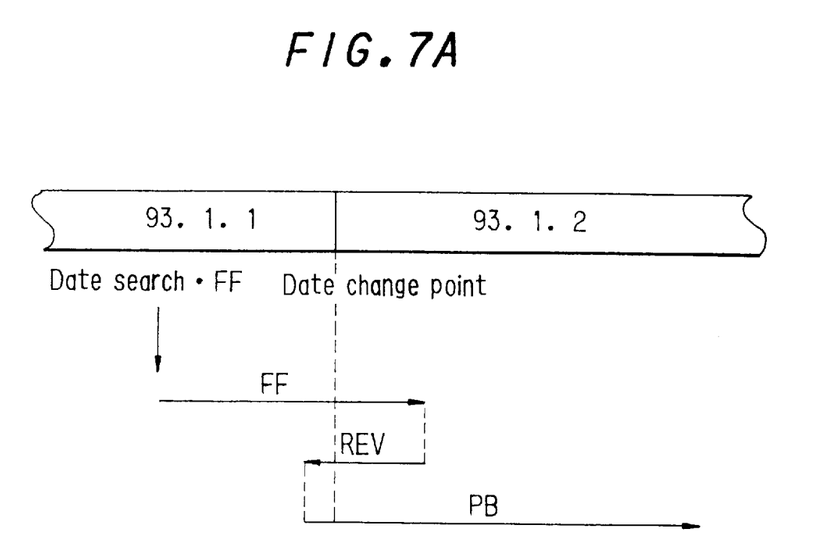
FIGS. 7A and 7B show an operation in a case where date search is started in a stop mode.

As shown in FIG. 6, when the date search key or the scan key is pressed in the stop mode (illustration of this operation is omitted) and then the fast-forward (FF) key is pressed, a search for a date change point is made in the fast-forward mode, and then a date change point cuing-up operation is executed in the review (REV) mode. When the date search key is pressed and then the fast-forward key is pressed, the operation mode shifts to the playback (PB) mode after the completion of the cuing-up operation. When the scan key is pressed and then the fast-forward key is pressed, an operation is repeated in which playback is performed for 10 seconds, for example, after the completion of the cuing-up operation, and thereafter the operation mode shifts to the search operation again. FIG. 7A shows the association between the date on the magnetic tape and the operation mode in a case where the date search key is pressed and then the fast-forward key is pressed.

Figure 7B:
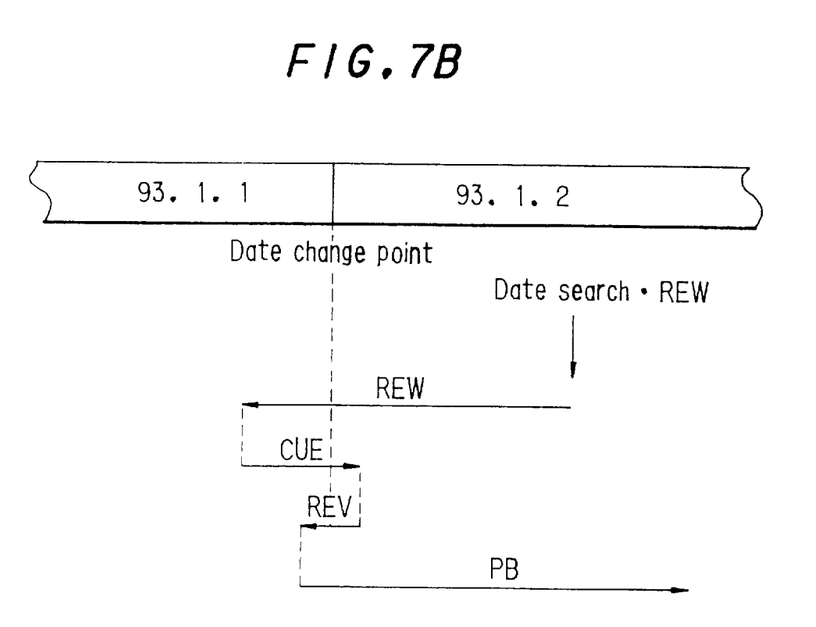

Referring to FIG. 6, when the date search key or the scan key is pressed in the stop mode and then the rewind (REW) key is pressed, a search for a date change point is made in the rewind mode, and then a date change point cuing-up operation is executed in the cue (CUE) mode. Further, the date change point cuing-up operation is performed in the review mode. FIG. 7B shows the association between the date on the magnetic tape and the operation mode in a case where the date search key is pressed and then the rewind key is pressed.

Figure 8:
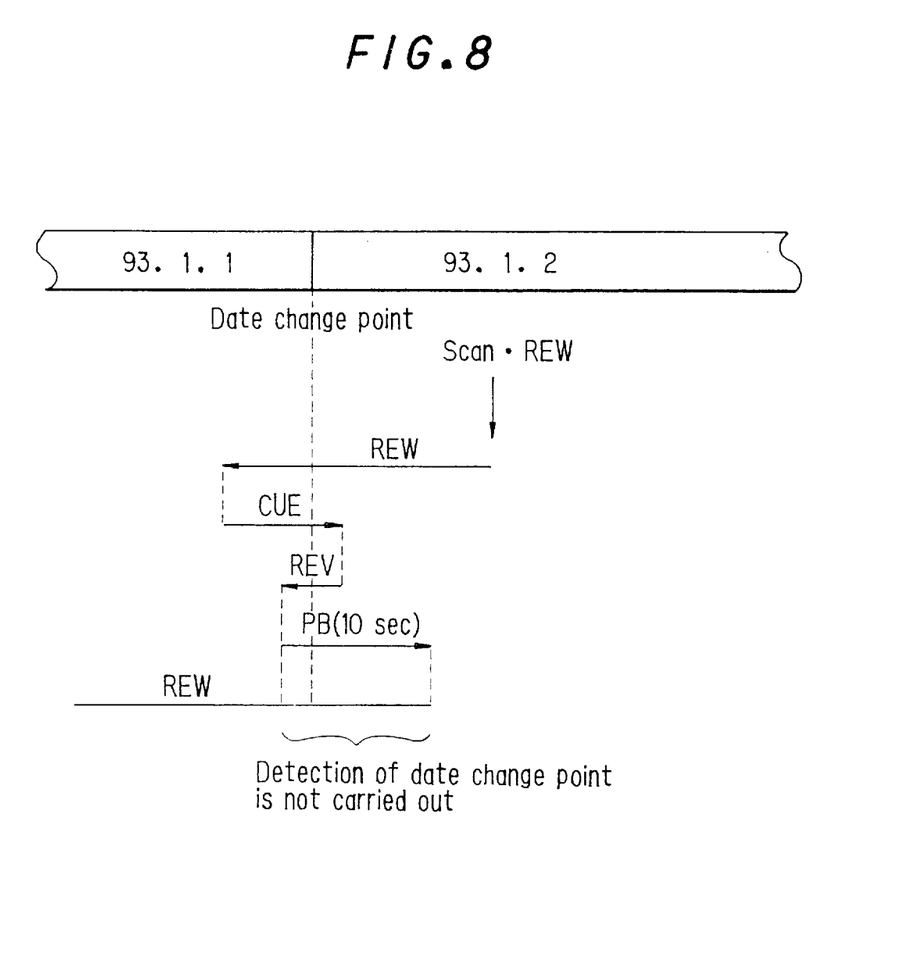
FIG. 8 shows an operation in a case where backward scan is started in the stop mode.

Referring to FIG. 6, when the date search key or the scan key is pressed in the playback mode and then the fast-forward key is pressed, a search for a date change point is made in the cue mode, and then a date change point cuing-up operation is executed in the review mode. That is, in the operation shown in FIG. 7A, the fast-forward (FF) operation is replaced by a cue operation. When the scan key is pressed and then the fast-forward key is pressed, an operation is repeated in which playback is performed for 10 seconds, for example, after the completion of the cuing-up operation, and thereafter the operation shifts to the search operation again. In this case, however, the system is controlled so that the date change point in the reproduced portion will not be detected during the playback performed for 10 seconds, as shown in FIG. 8, thereby preventing occurrence of such an operation that the same date change point is repeatedly detected.

Referring to FIG. 6, when the date search key is pressed in the playback mode and then the rewind key is pressed, a search for a date change point is made in the review mode. In this case, the search operation also serves as a cuing-up operation. That is, in the operation shown in FIG. 7B, both the rewind (REW) operation and the cue (CUE) operation are eliminated. When the scan key is pressed and then the rewind key is pressed, an operation is repeated in which playback is performed for 10 seconds, for example, after the completion of the cuing-up operation, and then the operation shifts to the search operation again.

Thus, in this embodiment, the cuing-up operation always ends in the review mode. Therefore, after the completion of the cuing-up operation, playback can be surely started from the top of the desired record, that is, the date change point.

Figure 9A:
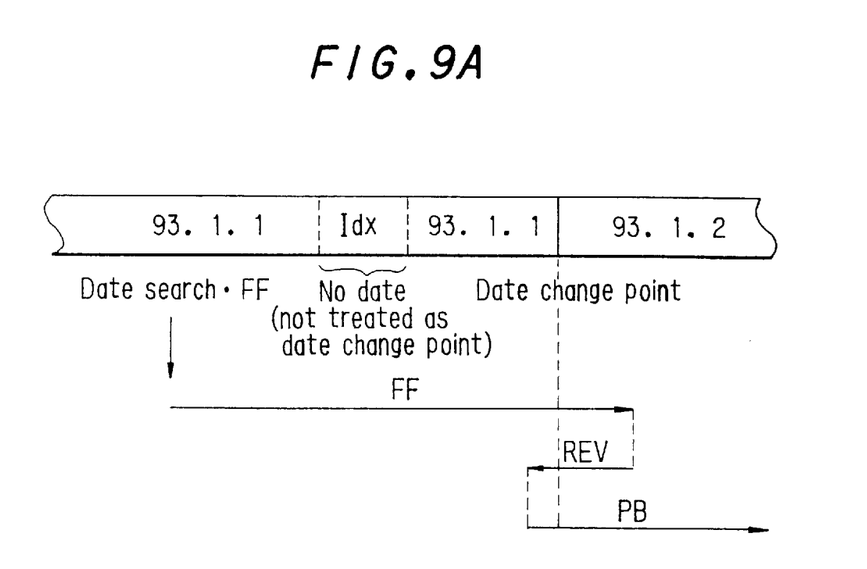
FIG. 9A shows an operation in a case where a search mark has been recorded.

The "date change point" in the present invention also includes a boundary between a dated portion and undated portion of the magnetic tape. Accordingly, the VTR in this embodiment enables detection of the top of an undated portion of the magnetic tape, e.g., an unrecorded portion of the magnetic tape. However, in a case where all the bits of the search mark are set to "0" or "1" in order to use it for index search, date information is erased, as described above. Therefore, the system is arranged so that in such a case, the boundary between a dated portion and an undated portion is not treated as a date change point, as shown in FIG. 9A.

Figure 9B:
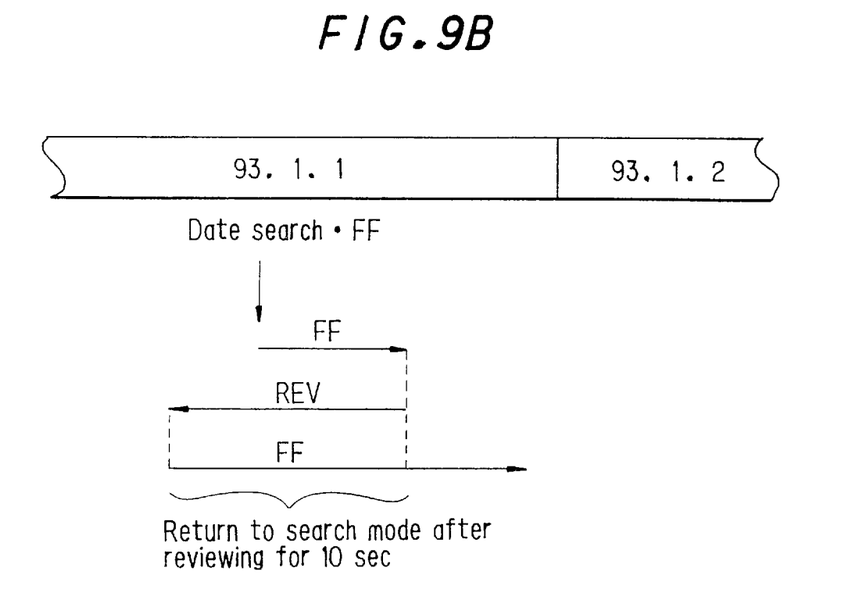
FIG. 9B shows the way in which the operation mode returns to a search operation after a cuing-up operation has been executed for a predetermined time.

Further, the system in this embodiment is arranged such that the operation mode returns to the previous search mode when a predetermined time (e.g., 10 seconds) has elapsed after the initiation of the cuing-up operation in order to prevent the cuing-up operation from continuing for a long time when it is decided during the search operation that the date has changed because of an erroneous operation caused by an influence of noise, for example, although the date has not actually changed. By doing so, even if the operation mode shifts to the review mode in the middle of the record dated "Jan. 1, 1993", as shown in FIG. 9B, the operation mode automatically returns to the fast-forward mode after the review mode has continued for a predetermined time. There is therefore no possibility of the review mode continuing up to the top of the record dated "Jan. 1, 1993".

It is possible to display on the electronic viewfinder 12 or an external monitor (not shown) the following information: keys (date search key, FF key, etc.) which are actuated during the date search operation, a search operation (FF, REW, etc.), a cuing-up operation (CUE, REV), and a date (e.g., "Jan. 1, 1993") represented by the reproduced video sub-code.

It should be noted that in the fast-forward mode and the rewind mode in this embodiment, the magnetic tape is run at a speed 15 to 40 times the running speed during recording, and no video signal is reproduced. In the cue mode, the magnetic tape is run at a speed 7 or 9 times the running speed during recording, whereas in the review mode, the magnetic tape is run at a speed 5 or 7 times the running speed during recording. In these modes, the video signal is reproduced.

3. Operation flowchart of this embodiment:

Next, the operation flowchart of the main microcomputer 2 for realizing the above-described date search operation will be explained with reference to FIGS. 10 to 13. This flowchart is designed as a loop which is repeated every field period of the video signal. In this flowchart, each decision step is indicated by a hexagon, and YES and NO as being results of decision are represented by Y and N, respectively, for the convenience of illustration.

Figure 10:
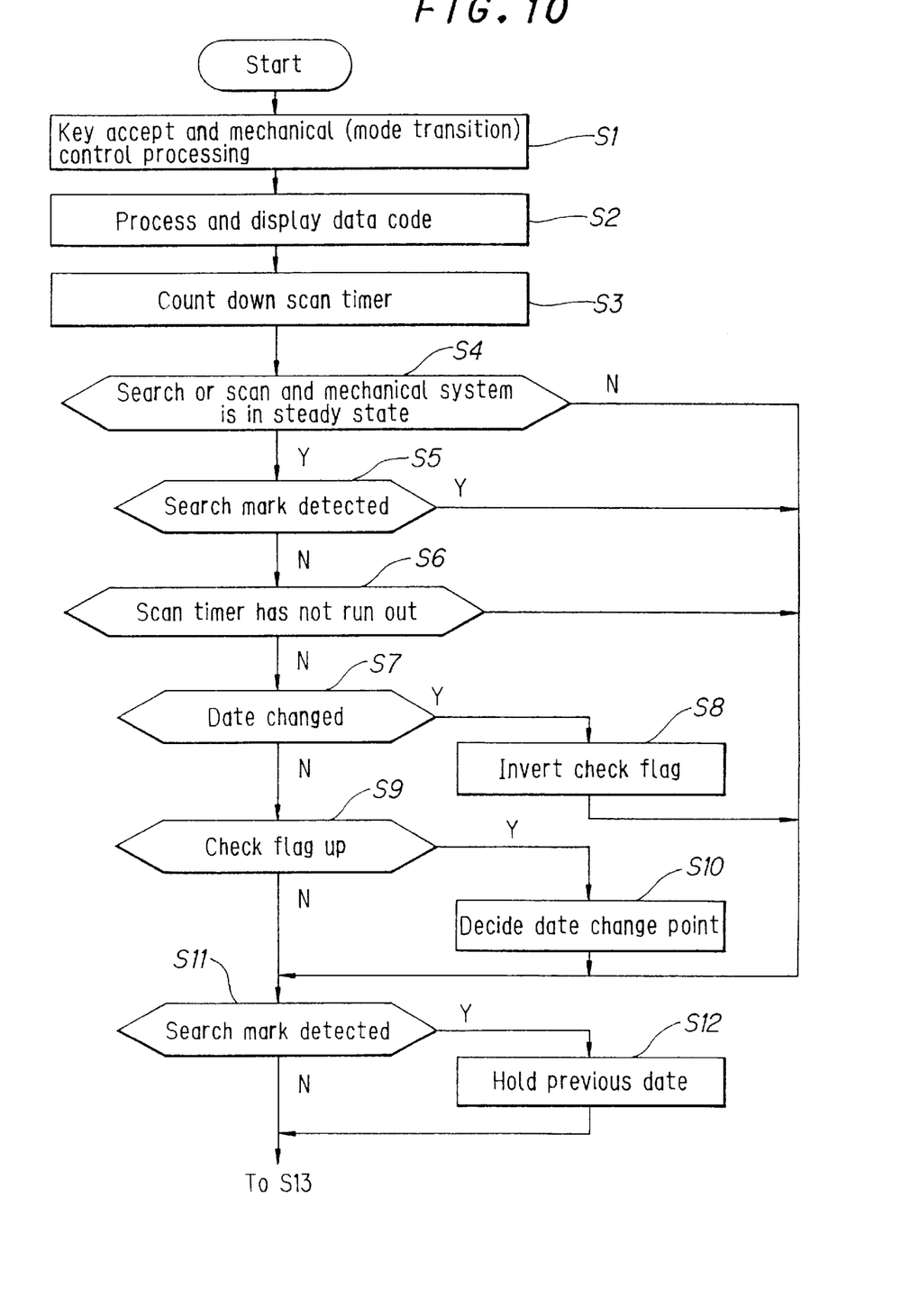
FIG. 10 is a part of a flowchart showing the operation of the embodiment of the present invention.

Step S1 in FIG. 10 is processing in which the key processing unit 2d decides which key has been inputted from the control unit 1, and the mechanical control unit 2e controls the mechanical driving unit 9. The mechanical (mode transition) control processing herein means control processing executed to activate the magnetic tape which is in a stop state so that it runs at a predetermined speed, for example, in the fast-forward mode. Step S2 is processing in which the reproduced date data is identified, and it is displayed on the EVF 12, for example. At Step S3, if a value has been set on the timer for scanning, the timer value is counted down (described later in detail).

At Steps S4 to S10, detection of a date change point is executed. As shown in Step S4, the detection of a date change point is initiated when the operation mode is date search or scanning and the mechanical system has entered a steady state. As shown in Steps S5 and S6, when a search mark is detected (i.e., the operation corresponds to FIG. 9A) and the timer for scanning has not yet run out, no detection is carried out. If a date change is detected at Step S7, the check flag is inverted at Step S8. That is, if the check flag has not yet been set, it is set, whereas, if the flag has already been set, it is reset. Thus, the fact that the date has changed is registered.

Figure 11:
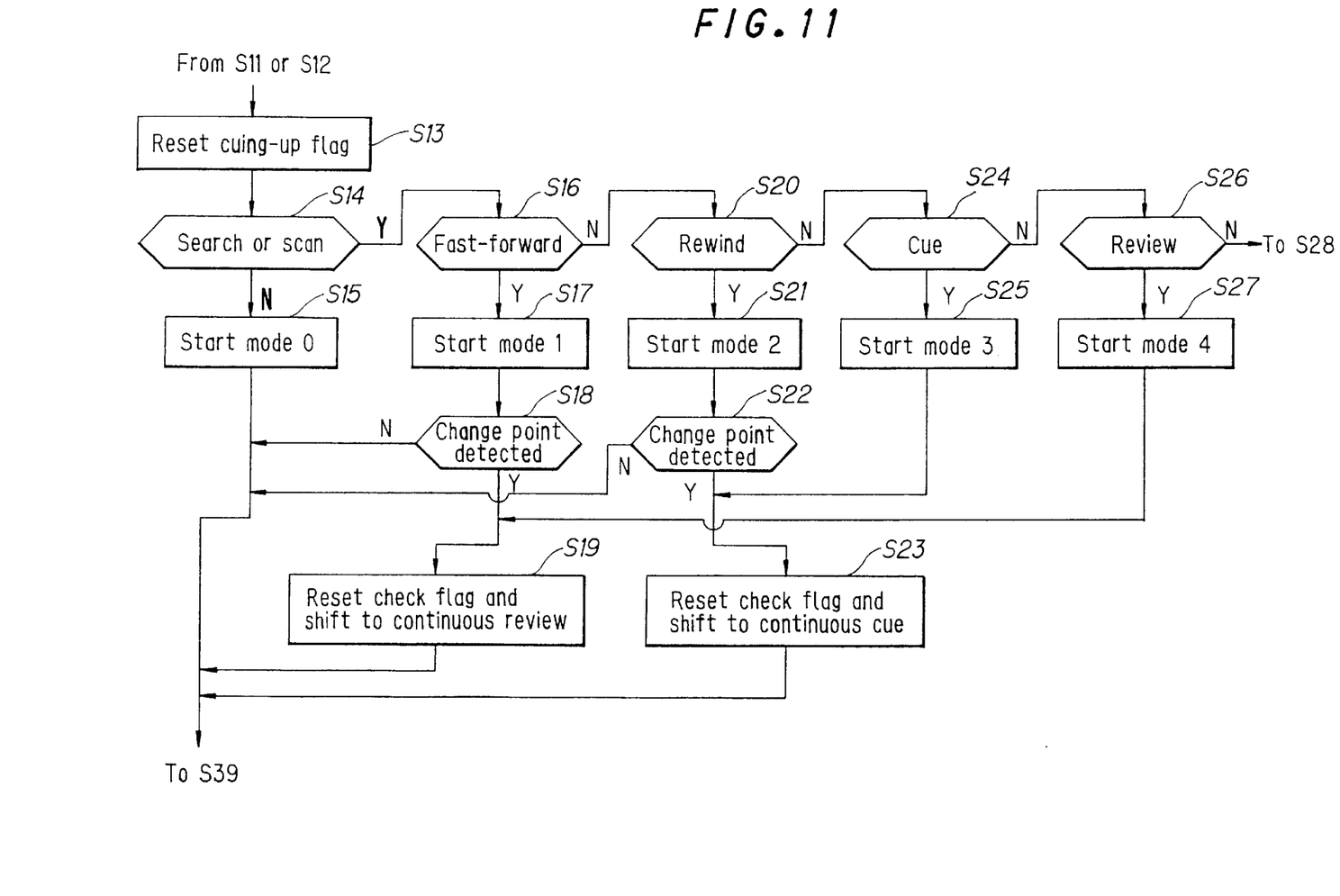
FIG. 11 is another part of the operation flowchart of the embodiment of the present invention.

Next, NO is obtained as a result of decision at Step S11, and the cuing-up flag is reset at Step S13, which is shown in FIG. 11. Since YES is the answer at Step S14, the process proceeds to Step S16. It should be noted that Steps S12 and S15 are used in processing that is executed when the operation mode is neither date search nor scanning.

Assuming that the date search key and the FF key are successively pressed at the control unit 1, as shown in FIG. 7A, YES is the answer at Step S16, and the start mode is set to 1 at Step S17. The start mode 1 herein means that the search operation has been started in the fast-forward mode. At the following Step S18, the answer is NO, and the answer is also NO at Steps S39 and S44, shown in FIG. 13. Thus, the processing is terminated. The reason why the result of decision at Step S18 is NO will be described later.

In the next repeated operation, the process restarts from Step S1, and NO is the answer at Step S7. If the check flag is up at Step S9, it is decided at Step S10 that a date change point has been detected. That is, only when a date change was detected one field period before and no date change has been detected in the present search operation, the detected date change is registered as being a date change point.

Next, NO is obtained as a result of decision at Step S11, and the cuing-up flag is reset at Step S13. The answer at Step S14 is YES, and the answer at Step S16 is also YES. Accordingly, the start mode is set to 1 at Step S17, and the process proceeds to Step S18. At Step S18, the answer is YES this time because it has been decided at Step S10 that a date change point has been detected. Therefore, the check flag is reset, and the process shifts to the continuous review mode. The term "continuous review" is herein employed to distinguish the review operation from a search operation which is started in the review mode as in the case of Step S26. Thereafter, the processing is executed in the same way as in the previous operation to reach a termination.

Figure 12:
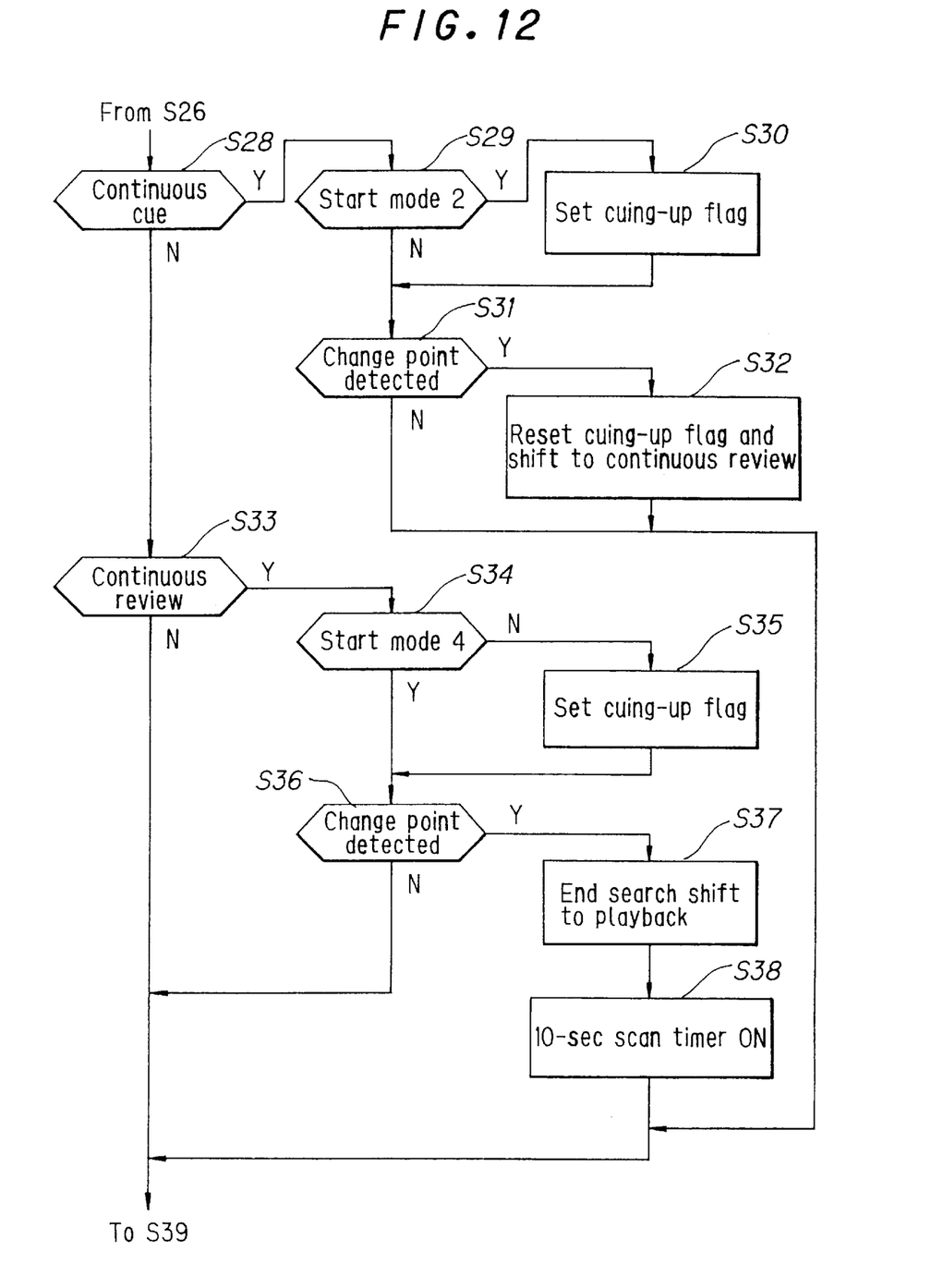
FIG. 12 is another part of the operation flowchart of the embodiment of the present invention.
Figure 13:
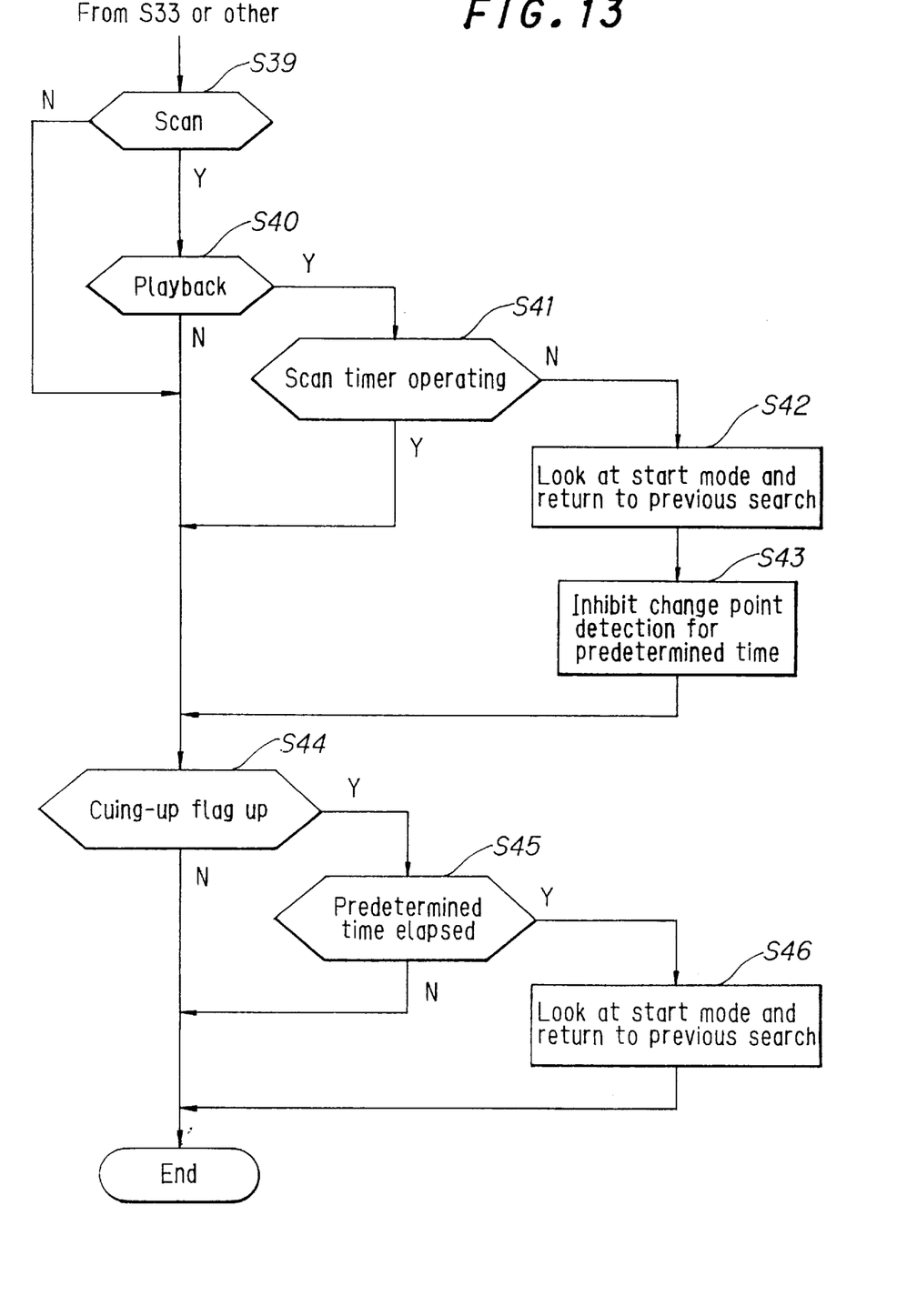
FIG. 13 is another part of the operation flowchart of the embodiment of the present invention.

During the next repeated operation, YES is obtained as a result of decision at Step S33, shown in FIG. 12, and NO is the answer at Step S34. Accordingly, the cuing-up flag is set at Step S35, and the process proceeds to Step S36. At Step S36, YES is obtained when a date change point, that is, a date change, has been detected in the first operation, and no date change has been detected in the subsequent repeated operation. Accordingly, in the first operation, NO is the answer at Step S36. The answer at Step S39 is NO, and the answer at Step S44 is YES. It is decided at Step S45 whether or not the cuing-up operation, i.e., the continuous review mode in this case, has continued for a predetermined time, that is, whether or not a malfunction has occurred (i.e., the operation corresponds to FIG. 9B). If NO, the processing is terminated, whereas, if YES, the operation mode returns to the start mode, that is, the fast-forward mode in this case, and the processing is terminated.

During the next repeated operation, the answer at Step S36 becomes YES, and the operation mode shifts to the playback mode at Step S37. Next, a 10-sec timer for scanning is turned on at Step S38. The answer at Step S39 is NO, and then the processing is terminated through Steps S44 and S45 in the same way as in the previous operation.

When the date search key and the fast-forward key are successively pressed in the stop mode, the cuing-up operation terminates with the above-described process (i.e., the operation corresponds to FIG. 7A). An operation that takes place when the date search key and the rewind key are successively pressed in the stop state (i.e., the operation corresponds to FIG. 7B) and an operation in a case where the date search key and the fast-forward or rewind key are successively pressed in the playback mode will be clear from the foregoing description. Therefore, description thereof is omitted. An operation in the scan mode, which corresponds to FIG. 8, will be explained below.

In the case of the scan mode, the answer at Step S39 is YES. During playback, that is, when the system is in the playback mode as shown in FIG. 8, YES is the answer at Step S40. Accordingly, the process proceeds to Step S41. If it is decided at Step S41 that the timer for scanning is not operating, that is, if 10 seconds or more has elapsed after the shift to the playback mode, the operation mode returns to the previous search mode, that is, the rewind mode in this case. Then, processing for inhibiting the detection of a change point for a predetermined time (e.g., 10 seconds) is executed at Step S43. This processing is realized by setting a value on the scanning timer. By doing so, detection of a date change point is inhibited until the scanning timer has run out at Step S6. Therefore, a date change point in the reproduced portion of the record is not detected.

Although in the foregoing embodiment, the present invention is applied to a VTR capable of both recording and reproducing information, it should be noted that the present invention is also applicable to a video player, which is designed for playback only. Further, although in the described embodiment each track contains the record of a PCM audio signal, together with a video signal and a video sub-code, it should be noted that the present invention is not necessarily limited to the described format, and that the present invention may be applied to any format as long as a video signal and date data are recorded in different portions on a diagonal video track.

As has been detailed above, according to the first aspect of the present invention, cuing up for a date change point is executed in the review mode. Therefore, upon completion of the cuing-up operation, it is possible to start playback just before the date change point without fail.

According to the second aspect of the present invention, it is possible to detect the top of an undated portion, e.g., an unrecorded portion, of a magnetic tape.

According to the third aspect of the present invention, when a search mark is given with date data erased, the search mark is not detected as a date change point. Accordingly, even when a search mark is recorded for index search, accurate date search can be performed.

According to the fourth aspect of the present invention, during the scan mode executed in the backward direction, a date change in the portion of the magnetic tape which has been run for playback is not detected. It is therefore possible to prevent occurrence of such an operation that the same date change point is repeatedly detected.

According to the fifth aspect of the present invention, when a cuing-up operation has continued for a predetermined time, the operation mode returns to a search operation. Accordingly, even when a cuing-up operation is started by mistake, it will not continue for a long time.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. An information signal reproducing apparatus for reproducing a video signal and date data from a magnetic tape having said video signal recorded on a predetermined portion of a diagonal track and further having said date data recorded on a portion of said diagonal track which is different from said video signal recording portion, said information signal reproducing apparatus comprising:

first means for setting a search mode for effecting cuing up at a point where said date data changes, said search mode corresponding to a first reproducing speed;

second means for detecting date data reproduced from said magnetic tape; and third means for controlling an operation mode of said information signal reproducing apparatus on the basis of outputs from said first and second means, said third means being capable of executing a search operation in the search mode set by said first means, and said third means being capable of executing a cuing-up operation in a review mode, said review mode corresponding to a second reproducing speed slower than said first reproducing speed wherein said third means effects control such that when the cuing-up operation has continued for a predetermined time without cuing-up at the point where the date data changes, the operation mode returns to search operation.

2. An information signal reproducing apparatus according to claim 1, wherein when a search mark is detected in a portion where no date data is present, said second means does not detect it as a date data change.

3. An information signal reproducing apparatus according to claim 1, wherein said first means provides a scan mode in which a cuing-up operation and a playback operation are alternately repeated, and during the scan mode executed in a backward direction said second means does not detect a date change in a portion which has been run during said playback operation.

4. An information signal reproducing apparatus according to claim 1, wherein said third means is operable to execute said search operation until a change in date data is detected by said second means, and is operable after said change in date data is detected to execute said cuing-up operation in said review mode until another change in date data is detected by said second means.

5. An information signal reproducing apparatus according to claim 4, wherein said third means is operable to execute said information signal reproducing apparatus in a playback mode when said change in date data is detected in said review mode.

6. An information signal reproducing apparatus according to claim 4, wherein said first means is operable to set said search mode as one of a fast-forward search mode and a fast-rewind search mode.

7. An information signal reproducing apparatus according to claim 4, wherein said review mode is a reverse review mode.

8. An information signal reproducing apparatus according to claim 4, wherein said third means is operable to terminate said cuing-up operation if said another change in date data is not detected by said second means within a predetermined amount of time after initiating said cuing-up operation in said review mode, and is operable to execute said search mode again upon terminating said cuing-up operation.

9. An information signal reproducing apparatus according to claim 1, wherein said second means is operable to detect a change in date data by detecting a change from a state where date data is present to a state where no date data is present, and by detecting a change from a state where no date data is present to a state where date data is present.

10. An information signal reproducing method for reproducing a video signal and date data from a magnetic tape having said video signal recorded on a predetermined portion of a diagonal track and further having said date data recorded on a portion of said diagonal track which is different from said video signal recording portion, said information signal reproducing method comprising the steps of:

the first step of setting a search mode for effecting cuing up at a point where said date data changes, said search mode corresponding to a first reproducing speed;

the second step of detecting date data reproduced from said magnetic tape; and the third step of controlling an operation mode on the basis of outputs obtained in said first and second steps, said third step including the steps of executing a search operation in the search mode set by said first step, and executing a cuing-up operation in a review mode, said review mode corresponding to a second reproducing speed slower than said first reproducing speed wherein said third step includes effecting control such that when the cuing-up operation has continued for a predetermined time without cuing-up at the point where the date data changes, the operation mode returns to the search operation.

11. An information signal reproducing method according to claim 10, wherein, in said second step, a search mark which is detected in a portion where no date data is present is not detected as a date data change.

12. An information signal reproducing method according to claim 10, wherein said first step includes providing a scan mode in which a cuing-up operation and a playback operation are alternately repeated, and in said second step, a date change in a portion which has been run during said playback operation is not detected during the scan mode executed in a backward direction.

13. An information signal reproducing method according to claim 10, wherein said third step is carried out by executing said search operation until a change in date data is detected, and executing after said change in date data is detected said cuing-up operation in said review mode until another change in date data is detected.

14. An information signal reproducing method according to claim 13, wherein said third step further includes executing said information signal reproducing method in a playback mode when said change in date data is detected in said review mode.

15. An information signal reproducing method according to claim 13, wherein said first step is carried out by setting said search mode as one of a fast-forward search mode and a fast-rewind search mode.

16. An information signal reproducing method according to claim 13, wherein said review mode is a reverse review mode.

17. An information signal reproducing method according to claim 13, wherein said third step includes the step of terminating said cuing-up operation if said another change in date data is not detected within a predetermined amount of time after initiating said cuing-up operation in said review mode, and executing said search mode again upon the termination of said cuing-up operation.

18. An information signal reproducing method according to claim 10, wherein said second step includes detecting a change in date data by detecting a change from a state where date data is present to a state where no date data is present, and by detecting a change from a state where no date data is present to a state where date data is present.

19. An information signal reproducing apparatus for reproducing a video signal and date data from a magnetic tape having said video signal recorded on a predetermined portion of a diagonal track and further having said date data recorded on a portion of said diagonal track which is different from said video signal recording portion, said information signal reproducing apparatus comprising:

first means for setting a search mode for effecting cuing up at a point where said date data changes, said search mode corresponding to a first reproducing speed;

second means for detecting date data reproduced from said magnetic tape; and third means for controlling an operation mode of said information signal reproducing apparatus on the basis of outputs from said first and second means, said third means being capable of executing a search operation in the search mode set by said first means, and said third means being capable of executing a cuing-up operation in a review mode, said review mode corresponding to a second reproducing speed slower than said first reproducing speed wherein said third means is operable to execute said search operation until a change in date data is detected by said second means, and is operable after said change in date data is detected to execute said cuing-up operation in said review mode detecting for change in date data during all of said review mode until another change in date data is detected by said second means, wherein said third means is operable to terminate said cuing-up operation if said another change in date data is not detected by said second means within a predetermined amount of time after initiating said cuing-up operation in said cuing-up operation.

20. An information signal reproducing method for reproducing a video signal and date data from a magnetic tape having said video signal recorded on a predetermined portion of a diagonal track and further having said date data recorded on a portion of said diagonal track which is different from said video signal recording portion, said information signal reproducing method comprising the steps of:

a first step of setting a search mode for effecting cuing up at a point where said date data changes, said search mode corresponding to a first reproducing speed;

a second step of detecting date data reproduced from said magnetic tape; and a third step of controlling an operation mode on the basis of outputs obtained in said first and second steps, said third step including the steps of executing a search operation in the search mode set by said first step, and executing a cuing-up operation in a review mode, said review mode corresponding to a second reproducing speed slower than said first reproducing speed wherein said third step is carried out by executing said search operation until a change in date data is detected, and executing after said change in date data is detected said cuing-up operation in said review mode detecting for change in date data during all of said review mode until another change in date data is detected, wherein said third step includes the step of terminating said cuing-up operation if said another change in date data is not detected within a predetermined amount of time after initiating said cuing-up operation in said review mode, and executing said search mode again upon the termination of said cuing-up operation.

* * * * *